Patented Jan. 10, 1950

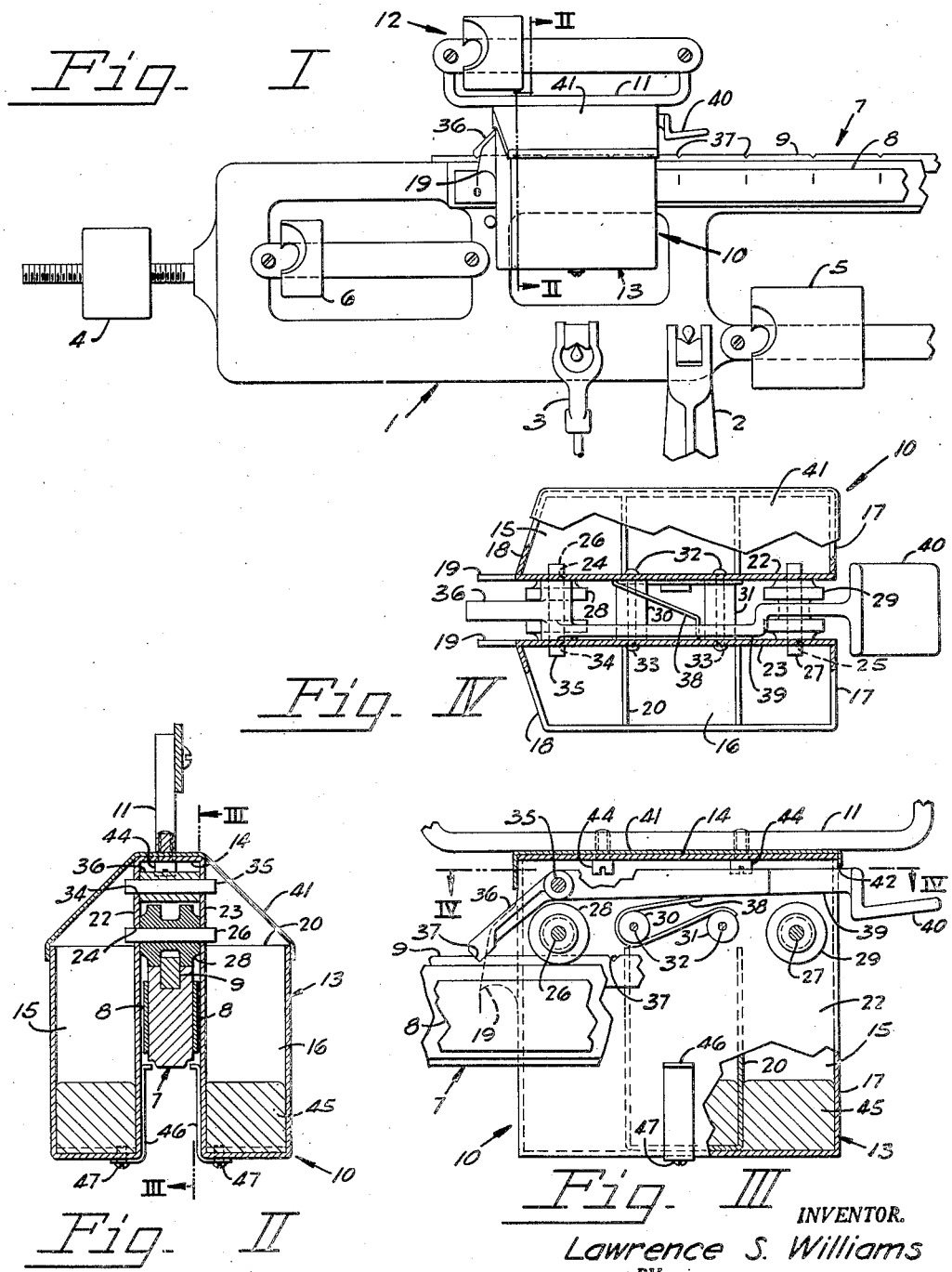

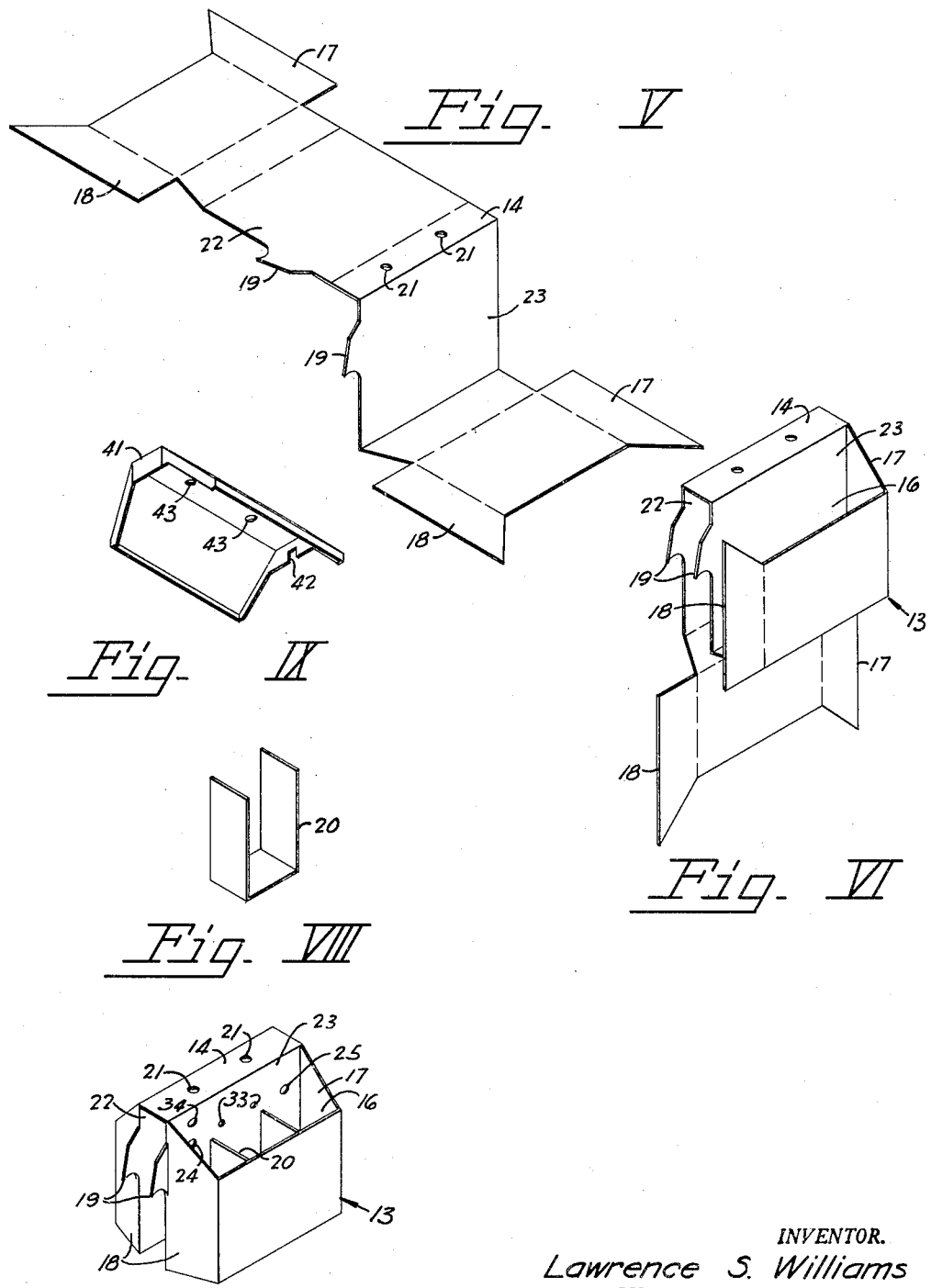

2,494,150

UNITED STATES PATENT OFFICE 2,494,150

WEIGHING SCALE POISE

Lawrence S. Williams, Toledo, Ohio, assignor to Toledo Scale Company, Toledo, Ohio, a corporation of New Jersey Application June 13, 1946, Serial No. 676,537

3 Claims. (Cl. 265—56.5)

In my co-pending application Ser. No. 644,031, now Patent Number 2,473,084; there is shown a weighing scale poise which is designed for use with a weigh beam. The structure shown in said patent consists of cast members which are designed to accomplish the objectives of elimination of precision machining, ease of assembly, versatility of employment, i. e. it is unnecessary to change the design for use with weigh beams of various depths and which accomplishes these objectives by straddling the weigh beam with which it is employed.

The instant invention is an improvement on the design shown in my co-pending application and has for its purpose the provision of a weighing scale poise adapted to be used with a weigh beam which can be more easily constructed than poises comprising castings.

A further advantage of the present improved form of poise construction lies in the fact that the ratio between its unloaded and loaded weights can be much greater than the same ratio of a poise constructed from castings.

A poise for a weigh beam has several requirements which determine its general construction. These include the necessity for providing an enclosed at least partially hollow body into which molten lead or other heavy material may be loaded to "seal" the poise at its predetermined weight so that when it is employed on the weigh beam it will counterbalance a weight on the scale corresponding to its position on the beam. Other requirements are that the assembled poise be rigidly and accurately formed and that means be provided to allow it to move freely along the beam and yet to be securely locked in any selected position.

These objectives are all met by my former poise construction and also are accomplished by the present construction.

This invention consists in constructing a weigh beam poise from a sheet of cut and folded metal having a rigid assembled structure and a low unloaded weight.

In the drawings:

Figure I is a fragmentary view in elevation of a portion of a weigh beam equipped with a poise embodying the instant invention.

Figure II is a vertical sectional view on an enlarged scale taken substantially on the line II—II of Figure I.

Figure III is a fragmentary vertical sectional view taken substantially on the line III—III of Figure II.

Figure IV is a sectional view taken substantially on the line IV—IV of Figure III.

Figure V is an isometric view of the main member of the poise embodying the instant invention shown in partly formed condition.

Figure VI is a view similar to Figure V but showing the poise in a later step in its formation.

Figure VII is a view similar to Figure VI but of the finally formed poise body.

Figure VIII is a view of a partition for the poise shown in Figure VII.

Figure IX is an isometric view from beneath of a formed cover for the poise shown in Figure VII.

The poise embodying the instant invention is designed for use with a weigh beam 1 which is pivoted on a fulcrum stand 2 and to which load is applied by a steelyard rod 3. The weigh beam 1 is equipped with a balance weight 4 and has two tare poises 5 and 6. The weigh beam 1 has an upper beam 7 on which is mounted two indicating bars 8 and a positioning bar 9. A weight counterbalance poise 10 is mounted on the upper beam 7 for longitudinal movement thereon and supports on its upper surface a fractional beam bracket 11 which mounts a fractional beam and poise 12 which indicate portions of the weight of the load being weighed that are smaller than the major increments of weight indicated by the position of the poise 10 with respect to the indicating bar 8.

The poise 10 consists of a main body 13 which is shown in Figure VII and which is generally saddle shaped. The body 13 has a center web 14 which overlies the beam 7 and two depending pockets 15 and 16 which lie one on each side of the beam 7 when the poise is mounted thereon. The body 13 (Figure V) is formed from a single sheet of metal which is cut with pairs of wings 17 and 18 at its ends and a pair of tabs 19 on one side near the center web 14. The sheet of metal from which the body 13 is formed is bent progressively as shown in Figures V, VI and VII to form a double U-shaped member with the horizontal web 14 between the adjacent arms of the two U's. The wings 17 and 18 are then bent inwardly to form the pockets 15 and 16. The edges of the various pieces of metal which form the walls of the pockets 15 and 16 are then welded or soldered or otherwise secured to form integral structures. A divider 20 is then dropped into each of the pockets 15 and 16 to provide compartments within the pockets.

When the sheet of metal from which the body is to be formed is blanked out a pair of holes 21 are punched in the web 14. After the body 13 is formed as shown in Figure VII five pairs of holes are drilled horizontally through the upper portions of inner walls 22 and 23 of the two pockets 15 and 16 respectively. Two of these pairs of holes 24 and 25 mount pins 26 and 27 respectively which serve as axles for twin rollers 28 and 29. The twin rollers 28 and 29 straddle the positioning bar 9 and run on the upper surface of the beam 7 supporting the poise 10 as it is moved along the beam. A pair of spacers 30 and 31 are mounted between the walls 22 and 23 on two pins 32 each of which extends through a pair of holes 33 drilled through the walls 22 and 23. The fifth pair of holes 34 mounts a pin 35 on which is swiveled a latch 36. The forward end of the latch 36 extends from between the walls 22 and 23 downwardly into engagement with a series of notches 37 cut in the positioning bar 9 and serves to hold the poise 10 in any one of the selected positions. The latch 36 is urged into any one of the notches 37 by a spring 38 which is twisted around the spacers 30 and 31 and bears on the under side of a rearwardly extending arm 39 of the latch 36. The arm 39 extends out from between the walls 22 and 23 and is formed into a handle 40 for manual operation and release of the latch 36.

When the latch 36 is engaged in one of the notches 37 the forward pointed ends of the tabs 19 are in line with similar indicia carried on the bars 8 which indicate the value of the load being counterbalanced by the poise in that particular position.

A formed cover 41 (see also Figure IX) is shaped from a single flat sheet of metal and overlies the web 14 of the poise body 13 and the open upper ends of the pockets 15 and 16. A notch 42 which is cut at the rear of the cover 41 accommodates the arm 39 of the latch 36. A pair of holes 43 are punched in the ridge of the cover 41 on the same centers as the holes 21 are punched in the web 14 of the poise body 13 with which the cover 41 is associated. A pair of screws 44 are inserted from beneath the holes 21 and the holes 43 and threaded into the fractional beam bracket 11 to hold it in place above the poise 10 and to secure the cover 41 to the poise body 13.

After a weigh beam poise has been assembled, i. e. in the case of the instant invention, after the poise body 13 has been formed and the rollers 28 and 29 and latch 36 correctly mounted in the poise, it may be loaded to a predetermined weight with lead or other loading material 45 which may be poured or staked in the pockets 15 and 16 to give the poise the proper weight for counterbalancing loads in accordance with the capacity of the scale and weigh beam on which it is to be employed. The poise 10 is retained on the beam 7, which it straddles, by means of a pair of clips 46 which are secured to the bottoms of the pockets 15 and 16 by screws 47 that also extend up and into the bottoms of the dividers 20. When it is desired to remove the poise from the beam the clips 46 are unscrewed and the poise can be lifted off the beam.

The poise usually is "sealed" to its exact final weight by being placed on the beam with which it is to be used and its load counterbalance ability tested against known weights. A poise embodying the instant invention is particularly adapted to such "sealing" procedure. The main body 13 with its latch and rollers can be placed on the beam and the fractional beam and poise 12 its bracket 11 and the cover 41 supported on the web 14 of the poise body 13 by simply inserting the screws 44 into the fractional beam bracket 11 from above so that they extend downwardly beyond the bracket 11 to properly position this structure with respect to the poise body 13 by extending into the holes 21. This permits the cover 41 to be easily removed from the poise in order to add or remove small quantities of the loading material 45. When the poise has been properly sealed to the tolerance required it can be removed from the beam and the screws 44 inserted in the positions shown in Figure III to assemble the entire structure.

The principal advantage of the construction described accrues from the fact that the poise body is formed of sheet material which need only be a fraction of an inch thick and which is extremely light in weight when compared to the finished weight of the loaded poise. This has the advantage of permitting the poise to be used with scales of many different capacities in addition to the advantages which arise from the simple stamping and bending of the sheet metal as contrasted with the more difficult casting operations necessary to produce a poise such as is shown in my co-pending application.

The embodiment of the invention which has been described may be modified to meet various requirements.

Having described the invention, I claim:

1. A sheet metal structure serving as a frame of a weighing scale poise, said structure comprising an assembly having an inverted U-shaped center portion including downwardly directed sections adapted to straddle a weigh beam, a laterally extending section at the lower termination of each section of the U-shaped center portion, an upwardly directed section at the end of each lateral section, and wings on some of said sections for forming end walls for the pockets formed by said sections.

2. A sheet metal structure serving as a frame of a weighing scale poise, said structure comprising an inverted U-shaped center portion, stiffening members for holding the walls of the U-shaped portion in alignment, rollers mounted in the U-shaped portion for supporting the poise on a weigh beam, downwardly extending extensions of the center portion straddling the weigh beam, and outwardly and upwardly extending extensions some of which have wings to cooperate with the other extensions to form pockets on either side of the weigh beam for the reception of loading material.

3. A sheet metal structure serving as a frame for a weighing scale poise, said structure comprising an inverted U-shaped section each leg of which has a first portion adjacent the face of the beam, a laterally extending portion and a vertical section, and wings adjacent some of the sections, said wings and sections forming pockets to receive poise loading material, a cover attachable to the center section and extending over the pockets, and rollers journaled in the U-shaped section for supporting the assembly.

LAWRENCE S. WILLIAMS.

REFERENCES CITED

The following references are of record in the file of this patent:

UNITED STATES PATENTS

| Number | Name | Date |
| --- | --- | --- |
| 808,421 | Williams | Dec. 26, 1905 |
| 1,900,418 | Seederer | Mar. 7, 1933 |